(12) United States Patent
Fujioka et al.

(10) Patent No.: US 7,057,876 B2
(45) Date of Patent: Jun. 6, 2006

(54) MULTILAYER CERAMIC CAPACITOR AND MANUFACTURING METHOD THEREOF

(75) Inventors: Yoshihiro Fujioka, Kokubu (JP); Kiyoshi Matsubara, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/193,284

(22) Filed: Jul. 28, 2005

(65) Prior Publication Data

US 2006/0023399 A1 Feb. 2, 2006

(30) Foreign Application Priority Data

Jul. 29, 2004 (JP) ............................. 2004-221993
Jul. 29, 2004 (JP) ............................. 2004-221994

(51) Int. Cl.
*H01G 4/06* (2006.01)
*C04B 35/46* (2006.01)

(52) U.S. Cl. ............................. 361/321.4; 361/321.5; 501/137

(58) Field of Classification Search ........ 501/137–139; 361/321.4, 321.5
See application file for complete search history.

(56) References Cited

U.S. PATENT DOCUMENTS

| 4,863,883 A | * | 9/1989 | Menashi et al. ............ 501/138 |
| 5,014,158 A | * | 5/1991 | Nishimura et al. ...... 361/321.4 |
| 6,291,380 B1 | * | 9/2001 | Yokoi et al. ................ 501/138 |

FOREIGN PATENT DOCUMENTS

| JP | 09-241075 | 9/1997 |
| JP | 2000-058378 | 2/2000 |
| JP | 2001-230149 | 8/2001 |

* cited by examiner

*Primary Examiner*—Eric W. Thomas
(74) *Attorney, Agent, or Firm*—Hogan & Hartson, LLP

(57) ABSTRACT

A multilayer ceramic capacitor comprises a dielectric layer and an internal electrode layer that are alternately laminated. Barium titanate particles containing an alkaline earth metal component except for Ba in a proportion of not more than 0.2 atomic % (BMTL), and barium titanate particles containing an alkaline earth metal component except for Ba in a proportion of not less than 0.4 atomic % (BMTH) coexist in the dielectric layer in an area ratio of BMTL to BMTH of 0.1 to 9. This provides excellent reliability of capacity temperature characteristic and high-temperature load lifetime, if the dielectric layer is thinned.

14 Claims, 1 Drawing Sheet

MULTILAYER CERAMIC CAPACITOR AND MANUFACTURING METHOD THEREOF

BACKGROUND OF THE INVENTION

1. Field of the Invention

The present invention relates to a multilayer ceramic capacitor and a manufacturing method thereof. In particular, the invention relates to a small, high capacity multilayer ceramic capacitor used in high-performance electronic equipment, such as personal computers and cellular phones, which comprises a dielectric layer and an internal electrode layer that are extremely thin and alternately laminated, thereby exhibiting excellent reliability such as capacity temperature characteristic and high-temperature load lifetime, as well as a manufacturing method of the same.

2. Description of Related Art

Recently, along with miniaturization and high performance of electronic equipment, a multilayer ceramic capacitor used therein demands a smaller size and a higher capacity. For the purpose of this, there is a tendency to increase the number of laminations of dielectric layers and internal electrode layers, and also thin the dielectric layer itself. Additionally, attempts are made to increase reliability such as capacity temperature characteristic and high-temperature load lifetime, as the characteristic of a multilayer ceramic capacitor.

As such a multilayer ceramic capacitor, ones disclosed in the following patent documents are known.

First, in a multilayer ceramic capacitor disclosed in Japanese Patent Publication Laid-Open No. 2001-230149, a dielectric porcelain is prepared in such a method of previously calcining $BaTiO_3$ and MgO, and then adding various oxides of rare earth elements, acceptor type elements, etc. to this calcined powder. There is described that with this two-stage mixing method, even after firing, the presence of the MgO previously allowed to go into solid solution can suppress diffusion of the subsequently added various oxides of rare earth elements and acceptor type elements, etc. into the $BaTiO_3$ crystal particles, thereby obtaining the above-mentioned desired characteristics.

Japanese Patent Publication Laid-Open No. 9-241075 describes that a dielectric porcelain is composed of two or more types of crystal particles having a mean particle size of 0.1 to 0.3 µm, and having different capacity temperature characteristics, thereby obtaining a multilayer ceramic capacitor that has flat capacity temperature characteristic and excellent DC bias characteristic.

In accordance with this publication, it is difficult to form crystal particles, being called "core shell structure," which realize flat capacity temperature characteristic and excellent DC bias characteristic when the particle size is not more than 1 µm in dielectric particles comprising mainly $BaTiO_3$. Consequently, dielectric particles having a particle size of not more than 1 µm should be subjected to further grain refinement so as to suppress dielectric activity, thereby obtaining flat capacity temperature characteristic and excellent DC bias characteristic, as a whole of dielectric porcelain.

Japanese Patent Publication Laid-Open No. 2000-58378 describes that the use of $Ba_{1-x}Ca_xTiO_3$ in which Ca is substituted in part for Ba of $BaTiO_3$ constituting dielectric porcelain also provides flat capacity temperature characteristic and excellent DC bias characteristic.

In the multilayer ceramic capacitor disclosed in the Japanese Patent Publication Laid-Open No. 2001-230149, the employment of a preliminary step of previously mixing and calcining $BaTiO_3$ and MgO enables to increase relative dielectric constant and also satisfy B characteristic in capacity temperature characteristic (−25° C. to 85° C. in temperature range; and within ±10% in capacity change rate), while capacity temperature characteristic does not satisfy a wide temperature range, i.e., X7R (−55° C. to 125° C. in temperature range; and within ±15% in capacity change rate).

In the dielectric porcelain described in the Japanese Patent Publication Laid-Open No. 9-241075, its relative dielectric constant can be increased up to about 2100, due to the grain refinement of dielectric particles.

In the $Ba_{1-x}Ca_xTiO_3$ described in the Japanese Patent Publication Laid-Open No. 2000-58378, the relative dielectric constant drop due to the substitution of Ca is too large to achieve a relative dielectric constant of more than 2000.

Especially, the capacitors provided with the dielectric layer as described in the foregoing respective patent documents exhibit low relative dielectric constant in the range of alternating field intensity of 0.002 to 1 Vrms/µm.

SUMMARY OF THE INVENTION

A main advantage of the present invention is to provide a small, high capacity multilayer ceramic capacitor that is excellent in reliability such as capacity temperature characteristic and high-temperature load lifetime, even when a dielectric layer is thinned, as well as a method of manufacturing the same.

Other advantage of the present invention is to provide a small, high capacity multilayer ceramic capacitor that exhibits a high relative dielectric constant in the range of alternating field intensity of 0.002 to 1 Vrms/µm, and that is excellent in reliability such as capacity temperature characteristic and high-temperature load lifetime, even when a dielectric layer is thinned, as well as a method of manufacturing the same.

A multilayer ceramic capacitor of the invention comprises a dielectric layer and an internal electrode layer that are alternately laminated. In the dielectric layer, barium titanate particles containing an alkaline earth metal component except for Ba, in a proportion of not more than 0.2 atomic % (BMTL), and barium titanate particles containing an alkaline earth metal component except for Ba, in a proportion of not less than 0.4 atomic % (BMTH) coexist in an area ratio of BMTL to BMTH of 0.1 to 9.

Specifically, in accordance with the present invention, the coexistence of two or more types of barium titanate particles having different concentrations of alkaline earth metal component except for Ba permits exhibiting a higher relative dielectric constant by dielectric particles having a low concentration of alkaline earth metal component except for Ba, and also permits flattening temperature characteristic of relative dielectric constant by dielectric particles having a high concentration of alkaline earth metal component except for Ba.

Preferably, the dielectric layer satisfies the relationship of $DL \leq DH$, wherein DL is a mean particle size of BMTL, and DH is a mean particle size of BMTH.

Specifically, a complex of these dielectric particles having the above particle relationship of $DL \leq DH$ permits a high relative constant and further flattening temperature characteristic of relative dielectric constant. In this case, the alkaline earth metal component is preferably at least one selected from Mg, Ca, and Sr, in order to maintain a higher relative dielectric constant and further flatten the temperature characteristic of relative dielectric constant.

Additionally, in accordance with the present invention, the mean particle sizes of BMTL and BMTH are preferably not more than 0.5 μm, in terms of a thinner dielectric layer and higher insulating properties. Further, the thickness of the dielectric layer is more preferably not more than 4 μm, in order that the capacitor can be miniaturized even if higher lamination is performed to achieve its higher capacity. Moreover, the internal electrode layer is preferably composed mainly of a base metal, in order that the internal electrode material cost can be reduced even for higher lamination.

A multilayer ceramic capacitor of the present invention may satisfy the relationship of DL>DH, preferably DL/DH=1.1 to 2, wherein DL is a mean particle size of BMTL, and DH is a mean particle size of BMTH. Further, the BMTH preferably contains an alkaline earth metal component except for Ba, in a proportion of 0.5 to 2.5 atomic %.

Specifically, a complex of these barium titanate particles in DL>DH, preferably DL/DH=1.1 to 2, permits a high relative dielectric constant in the range of alternating field intensity of 0.002 to 1 Vrms/μm, and permits further flattening the temperature characteristic of relative dielectric constant. In addition, the coexistence of dielectric particles having a low alkaline earth metal concentration and dielectric particles having a high alkaline earth metal concentration enables the dielectric layer to have high insulating properties.

In this case, the alkaline earth metal component is preferably at least one selected from Mg, Ca, and Sr, in order to maintain a higher relative dielectric constant and flatten the temperature characteristic of relative dielectric constant. Further, setting the mean particle sizes of BMTL and BMTH to not more than 0.7 μm enables to increase the number of grain boundaries in the dielectric layer and improve the insulating properties of the whole dielectric layer. Moreover, it is desirable that both BMTL and BMTH contain a rare earth element, and its concentration gradient is not less than 0.05 atomic %/nm from the surface to the interior, when the particles surface has the highest concentration. To achieve a thinner layer, higher capacity, and higher insulating properties of the dielectric layer, the thickness of the dielectric layer is more preferably not more than 4 μm. Additionally, the internal electrode layer is preferably composed mainly of a base metal, in order that the internal electrode material cost can be reduced even for higher lamination.

The above multilayer ceramic capacitor of the invention can be manufactured in the following manufacturing method. That is, a method of manufacturing a multilayer ceramic capacitor of the invention comprises the steps of:

(a) preparing calcined powder of $BaTiO_3$ by adding, to $BaTiO_3$ powder, an oxide of an alkaline earth metal element except for Ba, and calcining at temperatures of under 850° C.;

(b) forming a dielectric green sheet by preparing and forming a slurry by mixing the calcined powder of $BaTiO_3$ with $Ba_{1-x}M_xTiO_3$ (M is Mg, Ca, or Sr; and X is 0.01 to 0.2) powder, a rare earth element compound, a Mn compound, an oxide of an alkaline earth metal element except for Ba, and an organic vehicle;

(c) forming an internal electrode pattern on a surface of the dielectric green sheet; and (d) laminating and firing a plurality of dielectric green sheets with the internal electrode pattern formed thereon.

Specifically, in accordance with the manufacturing method of the invention, the $BaTiO_3$ powder and $Ba_{1-x}M_xTiO_3$ (M and X are the same as above) having different sintering properties and grain growth rates are used as the raw powder for forming dielectric porcelain. To suppress reaction between these raw material powders during firing, an alkaline earth metal element except for Ba is added to the raw material powder of $BaTiO_3$ containing no alkaline earth metal element, and calcined at low temperatures of under 850° C., thereby allowing part of the alkaline earth metal element except for Ba to go into solid solution in the $BaTiO_3$ powder. This permits the alkaline earth metal element to go into solid solution particularly in the vicinity of a surface layer in the $BaTiO_3$ powder. As a result, it is possible to suppress diffusion of the alkaline earth metal element from the side of the $Ba_{1-x}M_xTiO_3$ (M and X are the same as above) to the side of the $BaTiO_3$ containing no alkaline earth metal element. It is also possible to suppress the reaction between the raw material powders. These enable to maintain the coexistence of the dielectric particles having different alkaline earth metal component concentrations in the dielectric layer.

Additionally, in accordance with the method that allows part of the alkaline earth metal element to go into solid solution at low temperatures of under 850° C. in the above-mentioned raw material powder of $BaTiO_3$, it is also possible to prevent the subsequently added rare earth element compound and other additives from going into solution in the $BaTiO_3$ powder. Further, this method makes it easy to satisfy in the dielectric layer the relationship of DL≦DH, which is the relationship between the mean particle size DL of BMTL and the mean particle size DH of BMTH.

In this case, the effect of adding the alkaline earth metal element can be improved by arranging such that the proportion of the oxide of an alkaline earth metal element to be added in the step (a) is 30 to 70%, in mole ratio, of the oxides of all alkaline earth metal elements added in the steps (a) and (b). Especially, when the added oxide of an alkaline earth metal element is MgO, there is a large ionic radius difference with Ba ion of $BaTiO_3$. This enables to reduce the solid solution amount of ions into $BaTiO_3$, thereby allowing MgO to go into solid solution in the vicinity of the surface layer of $BaTiO_3$.

On the other hand, when M in $Ba_{1-x}M_xTiO_3$ (M and X are the same as above) powder is Ca, the presence of solid solution of an element smaller than the above M, such as Mg, in $BaTiO_3$ permits to suppress diffusion of an alkaline earth metal element having a large ionic radius, such as Ca to be diffused later. Specifically, the effect of adding the alkaline earth metal element except for Ba into the $BaTiO_3$ power in the present invention is as follows. The use of the element having a smaller ionic radius of a alkaline earth metal element, which is first added to the $BaTiO_3$ powder, can suppress diffusion of an alkaline earth metal element from the side of $Ba_{1-x}M_xTiO_3$ (M and X are the same as above) powder. The mean particle sizes of $BaTiO_3$ powder and $Ba_{1-x}M_xTiO_3$ (M and X are the same as above) powder are more preferably not more than 0.4 μm, with which it seems difficult to control the solid solution of elements. Further, an internal electrode pattern in the above manufacturing method is preferably composed mainly of a base metal in terms of low cost. It is desirable to use a conductor pattern made of a plated film in terms of achieving a thinner layer.

Other method of manufacturing a multilayer ceramic capacitor of the invention comprises the steps of:

(a') preparing calcined powder of $BaTiO_3$ and calcined powder of $Ba_{1-x}M_xTiO_3$ powder, respectively, by adding an oxide of an alkaline earth metal element except for Ba, to $BaTiO_3$ powder having a mean particle size of 0.05 to 0.5

μm, and $Ba_{1-x}M_xTiO_3$ (M is Mg, Ca, or Sr; and X is 0.01 to 0.2) powder having a smaller mean particle size than the $BaTiO_3$ powder, respectively, and then calcining at temperatures of under 850° C.;

(b') forming a dielectric green sheet by preparing and forming a slurry by mixing the calcined powder of $BaTiO_3$ and the calcined powder of $Ba_{1-x}M_xTiO_3$ powder with a rare earth element compound, an Mn compound, an oxide of an alkaline earth metal, and an organic vehicle;

(c') forming an internal electrode pattern on a surface of the dielectric green sheet; and (d') laminating and firing a plurality of dielectric green sheets with the internal electrode pattern formed thereon.

Specifically, the $BaTiO_3$ powder and $Ba_{1-x}M_xTiO_3$ powder that have different mean particles sizes at the initial starting material stage, as well as different sintering properties and grain growth rates, are used as the raw material powder for forming dielectric porcelain. To suppress reaction between these raw material powders during firing, part of an alkaline earth metal element except for Ba is previously allowed to go solid solution in these powders at low temperatures of under 850° C. This allows the alkaline earth metal element to go into solid solution especially in the vicinity of the surface of the calcined powders. Therefore, it is possible to suppress diffusion of the alkaline earth metal element from the side of the $Ba_{1-x}M_xTiO_3$ powder containing alkaline earth metal element to the side of the $BaTiO_3$ powder containing less alkaline earth metal element. It is also possible to suppress the reaction between the raw material powders. These permit to maintain the coexistence of the dielectric particles having different alkaline earth metal component concentrations in the dielectric layer.

In this case, the effect of adding the alkaline earth metal elements can be improved by arranging such that the proportion of an oxide of an alkaline earth metal element to be added in the step (a') is 30 to 60%, in mole ratio, of the oxides of all alkaline earth metal elements added in the steps (a') and (b').

DESCRIPTION OF PREFERRED EMBODIMENTS

First Preferred Embodiment

Figure 1:
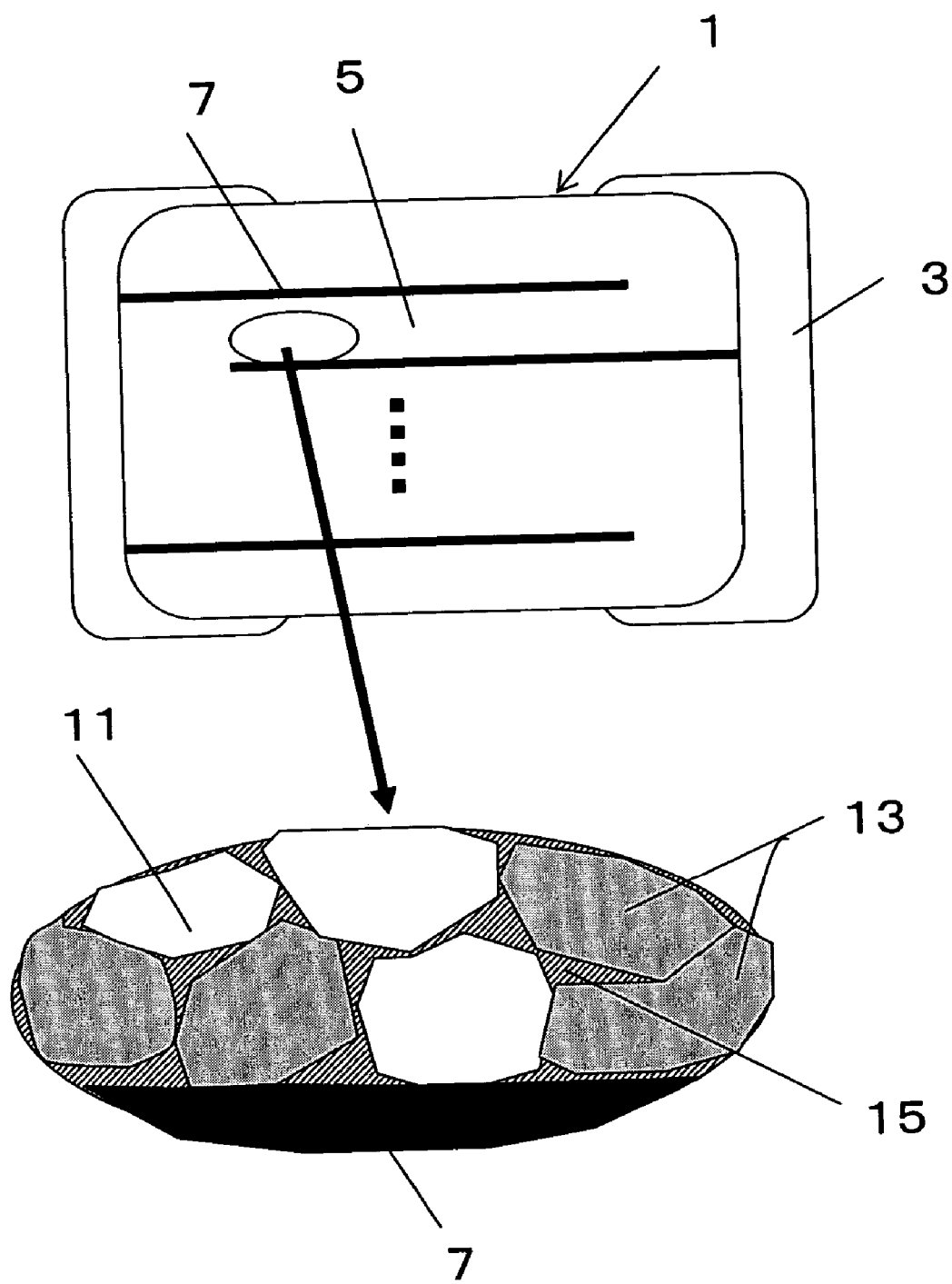
FIG. 1 is a schematic sectional view of a multilayer ceramic capacitor according to the present invention.

A multilayer ceramic capacitor according to a first preferred embodiment is now described in detail with reference to the schematic sectional view in FIG. 1. The multilayer ceramic capacitor of the invention is constructed by forming an external electrode 3 at both ends of a capacitor body 1. The external electrode 3 can be formed by baking Cu, or an alloy paste of Cu and Ni.

The capacitor body 1 is constructed by alternately laminating a dielectric layer 5 and an internal electrode layer 7. The dielectric layer 5 is composed of dielectric particles 11 having a low concentration of alkaline earth metal except for Ba, and comprising mainly Ba and Ti; dielectric particles 13 having a high concentration of alkaline earth metal except for Ba and comprising mainly Ba and Ti; and grain boundary phases 15. The thickness of the dielectric layer 5 is preferably not more than 4 μm, particularly not more than 3 μm for the sake of increasing electrostatic capacity. In order to maintain insulating properties, the thickness of the dielectric layer 5 is preferably not less than 0.5 μm, particularly not less than 1 μm. Moreover, to stabilize variations in electrostatic capacity and capacity temperature characteristic, variations in the thickness of the dielectric layer 5 is preferably within 10%.

The internal electrode layer 7 is preferably a base metal such as Ni and Cu, for the sake of suppressing manufacturing cost even for higher lamination. In particular, Ni is more preferable in order to achieve simultaneous firing with the dielectric layer. The thickness of the internal electrode layer 7 is preferably not more than 2 μm in average.

It is especially important that barium titanate particles containing an alkaline earth metal component except for Ba, in a proportion of not more than 0.2 atomic % (BMTL), and barium titanate particles containing an alkaline earth metal component except for Ba, in a proportion of not less than 0.4 atomic % (BMTH) coexist in the dielectric layer 5 in an area ratio of BMTL to BMTH of 0.1 to 9. Hereat, the alkaline earth metal component of the BMTH is preferably in the range of 0.4 to 1 atomic %.

If the alkaline earth metal component concentration of the BMTL particles having a low concentration of an alkaline earth metal element except for Ba is not less than 0.2 atomic %, the relative dielectric constant of the particles is lowered, and it becomes difficult to distinguish from the BMTH particles having a high concentration of an alkaline earth metal element except for Ba, thereby making it difficult to control temperature characteristic.

When the BMTL/BMTH ratio is small than 0.1, a low ratio of the amount of BMTL would cause the dielectric layer 5 to have a low relative dielectric constant. On the other hand, when the BMTL/BMTH ratio is larger than 9, this would reduce the effect of flattening the temperature characteristic of relative dielectric constant by virtue of the BMTH. To further improve the above relative dielectric constant and its temperature characteristic, the BMTL/BMTH ratio is more preferably in the range of 0.25 to 4.

It is also important for dielectric particles constituting the dielectric layer of the invention to satisfy the relationship of DL≦DH, wherein DL is a mean particle size of the BMTL, and DH is a mean particle size of the BMTH. In this case, it is possible to increase the relative dielectric constant of the BMTH particles that generally exhibits a low relative dielectric constant, and also improve temperature characteristic. Preferably, DL/DH=0.4 to 1.

It is also desirable that the alkaline earth metal component being in solid solution in the BMTH particles having a high ratio of an alkaline earth metal element is at least one selected from Mg, Ca, and Sr. In particular, Ca is more desirable because its high solid solution rate to $BaTiO_3$ is suitable for improving the relative dielectric constant of $BaTiO_3$ and its temperature characteristic.

To achieve high insulating properties, the mean particle sizes of BMTL and BMTH are more preferably not more than 0.5 μm, particularly not more than 0.4 μm. To increase relative dielectric constant, they are preferably not less than 0.1 μm.

Further, the thickness of the dielectric layer 5 is preferably not more than 4 μm. The internal electrode layer 7 is composed of a base metal such as Cu, Ni, or Co. Among these, Ni is preferable because the sintering temperature of metal coincides with that of the above dielectric material.

Additionally, it is preferable in the dielectric layer 5 of the invention that when the grain boundary phase 15 as a grain boundary surface has the highest concentration, a rare earth element compound has a concentration gradient from the crystal particle surface to the particle interior, and that it is not less than 0.05 atomic %/nm. In short, if the concentration gradient of the rare earth element is in such conditions, the relative dielectric constant and high-temperature load lifetime can be improved, and capacity temperature characteristic satisfying X7R standard can be obtained.

As a rare earth element in the invention, it is preferable to use at least one selected from La, Ce, Pr, Nd, Sm, Gd, Th, Dy, Ho, Y, Er, Tm, Yb, Lu, and Sc.

As described above, the $BaTiO_3$ crystal particles of the invention are ones in which Mg goes into solid solution in a surface region by calcination. To enhance suppression of the diffusion and solid solution of a rare earth element, the concentration gradient of Mg at the surface region of the $BaTiO_3$ crystal particles is preferably not less than 0.003 atomic %/nm, more preferably not less than 0.01 atomic %/nm, toward the particle inside, letting the particle boundary side be high concentration side.

Manufacturing Method

A manufacturing method of the invention comprises the step of preparing $BaTiO_3$ powder and $Ba_{1-x}M_xTiO_3$ (M is Mg, Ca, or Sr; and X is 0.01 to 0.2. The same holds true in the following.) powder; and the step of preparing calcined powder of $BaTiO_3$ by adding an oxide of an alkaline earth metal element except for Ba into the $BaTiO_3$ powder, and then calcining at temperatures of under 850° C. The $Ba_{1-x}M_xTiO_3$ powder as used here is to become the abovementioned BMTH particles after firing, and the composition range X of an M component is more preferably in the range of 0.02 to 0.1, for the sake of improving electrostatic capacity and temperature characteristic. It is important to prepare $BaTiO_3$ powder in which the oxide of an alkaline earth metal element except for Ba goes into solid solution and is formed on the surface of the $BaTiO_3$ powder, by subjecting only the $BaTiO_3$ powder to calcination at temperatures of under 850° C., in the $BaTiO_3$ powder and $Ba_{1-x}M_xTiO_3$ powder. Preferably, the oxide of an alkaline earth metal element except for Ba is present on the surface of the $BaTiO_3$ powder.

The $BaTiO_3$ powder and $Ba_{1-x}M_xTiO_3$ powder used here as the main raw materials are preferably obtained by hydrothermal synthesis method, because particle size distribution is narrow and crystal characteristic is high. Its mean particle size is preferably not less than 0.1 μm and not more than 0.4 μm. The specific surface area of such fine powders is preferably 1.7 to 6.6 ($m^2$/g). Specifically, in the present invention it is also desirable to set surface specific area to the above range, in addition to mean particle size, because it is necessary to allow the powders to have high reactivity, in order to form, by a low-temperature calcination, the $BaTiO_3$ powder in which the oxide of an alkaline earth metal element except for Ba goes into solid solution and is present on the surface.

In the manufacturing method of the invention it is also desirable that in order to suppress grain growth during firing, at least one of the barium titanate particles whose alkaline earth component concentration is not more than 0.2 atomic % (BMTL), and the barium titanate particles whose alkaline earth component concentration is not less than 0.4 atomic % (BMTH) satisfies the relationship of A/B≧1.003, in mole ratio, wherein A site is barium, or barium and an alkaline earth element, and B site is titanate.

The calcination temperature in the manufacturing method of the invention is preferably under 850° C., particularly under 750° C., in order to prevent MgO from going into solid solution in the $BaTiO_3$ powder in which the alkaline earth metal composition, e.g. MgO, is in solid solution on the surface, as described above. On the other hand, to ensure diffusion and solid solution of MgO to the surface of $BaTiO_3$ powder, the calcination temperature is preferably above 600° C., particularly above 650° C. The mean particle size of MgO powder used here is preferably not more than 0.3 μm. Thus in the present invention, the diffusion and solid solution of the rare earth element can be suppressed by using the $BaTiO_3$ powder after being subjected to calcination with MgO.

In contrast, when the calcination temperature, at which an oxide of an alkaline earth metal element except for Ba, which is typically MgO, is allowed to go into solid solution in $BaTiO_3$ powder, is higher than 850° C., Mg in the vicinity of the grain boundary is apt to go into diffusion and solid solution. This can facilitate the diffusion and solid solution of the rare earth element compound, so that the grain growth of barium titanate particles having a low alkaline earth metal element concentration (BMTL) is apt to occur, and the temperature characteristic of electrostatic capacity fails to satisfy a desired characteristic.

Unlike the above process of the invention, if $BaTiO_3$ powder and $Ba_{1-x}M_xTiO_3$ powder are added at a time, together with additives such as a rare earth element compound and an Mn compound, without allowing an oxide of an alkaline earth metal element except for Ba to previously go into solid solution in the $BaTiO_3$ powder, it is difficult to form one in which the oxide of an alkaline earth metal element except for Ba goes into solid solution, on a surface layer of the $BaTiO_3$. Hence, much M component etc. diffuses from the $Ba_{1-x}M_xTiO_3$ powder. As a result, the relative dielectric constant inherent in the $BaTiO_3$ cannot be maintained, and it will drop to cause the electrostatic capacity drop.

The proportion of the oxide of an alkaline earth metal element to be added in the above step (a) in the manufacturing method of the invention is preferably, in mole ratio (mass ratio), 30 to 70% of the oxide of all alkaline earth metal elements to be added in the above steps (a) and (b). The alkaline earth metal element is preferably MgO. The M component in the (Ba, M) $TiO_3$ is preferably Ca.

The mean particle sizes of the $BaTiO_3$ powder and $Ba_{1-x}M_xTiO_3$ powder are preferably not more than 0.4 μm. The dielectric layer of the invention contains a glass phase. As this glass phase, glass powder of Si—Li—Ca type is suitable.

Next, a dielectric green sheet is formed by mixing the calcined power of $BaTiO_3$ powder and the $Ba_{1-x}M_xTiO_3$ powder with a rare earth element compound, a Mn compound, an oxide of an alkaline earth metal element, and an organic vehicle at a predetermined proportion to prepare a slurry, and then forming the slurry. The forming with use of the slurry can be suitably performed by sheet forming method such as die coater. The thickness of the dielectric green sheet formed by this forming method is preferably not more than 5 μm, particularly not more than 4 μm.

Subsequently, an internal electrode pattern is formed on a surface of the dielectric green sheet. The internal electrode pattern is formed by performing screen-printing of one in which powder of a base metal such as Ni or Cu is pasted together with organic resin and solvent. The thickness of the internal electrode pattern is preferably not more than 4 μm that is thinner than the thickness of the dielectric green sheet, in order to minimize gaps on the dielectric green sheet.

Subsequently, a plurality of the dielectric green sheets with the internal electrode pattern formed thereon are laminated to form a forming body for capacitor body. The capacitor body is then subjected to debinding processing at 400 to 500° C. in atmosphere and at a temperature raising rate of 40 to 80° C./h. Thereafter, the temperature raising rate from 500° C. is set to 100 to 400° C./h, and this capacitor body is fired in reducing atmosphere at temperatures of 1100 to 1300° C. for 2 to 5 hours. This is followed by cooling at a temperature lowering rate of 80 to 400° C./h, and then reoxidization at 750 to 1100° C. in atmosphere.

Finally, a paste for external electrode is applied to both end surfaces of the fired capacitor body, and then baked in nitrogen to form an external electrode 3, thereby obtaining a multilayer ceramic capacitor of the invention.

Second Preferred Embodiment

A second preferred embodiment of the invention will next be described. Like the first preferred embodiment, a multilayer ceramic capacitor according to the second preferred embodiment has the structure as shown in FIG. 1.

In this preferred embodiment, there coexists $BaTiO_3$ particles whose concentration of an alkaline earth metal component except for Ba is not more than 0.2 atomic % (BMTL), and $BaTiO_3$ particles whose concentration of an alkaline earth metal component except for Ba is not less than 0.4 atomic %, preferably 0.5 to 2.5 atomic % (BMTH). It is important to satisfy the relationship of DL>DH, particularly DL/DH=1.1 to 2, wherein DL is a mean particle size of BMTL, and DH is a mean particle size of BMTH.

If the concentration of an alkaline earth metal component of the BMTL particles exceeds 0.2 atomic %, and the concentration of an alkaline earth metal component of the BMTH particles is less than 0.4 atomic %, the alkaline earth metal element concentration of the BMTL and that of the BMTH are overlapped each other. Hence it is hard to exhibit the features of relative dielectric constant and temperature characteristic due to concentration difference between alkaline earth metal elements, thereby causing a drop in the effect of coexistence of the two types of dielectric particles. Further, if the concentration of an alkaline earth metal component of the BMTH particles exceeds 2.5 atomic %, the relative dielectric constant of the BMTH is liable to drop considerably.

When the DL/DH ratio is smaller than 1.1, the relative dielectric constant in an alternating field of 0.002 to 1 Vrms/μm is liable to increase considerably. On the other hand, when the DL/DH ratio is larger than 2, capacity temperature characteristic is liable to increase. To further improve the above relative dielectric constant and its temperature characteristic, the DL/DH ratio is more preferably 1.1 to 1.5.

The alkaline earth metal component, which exists in solid solution in the BMTH particles having a high proportion of the alkaline earth metal element, is preferably at least one selected from Mg, Ca, and Sr. In particular, Ca is more desirable because its high solid solution rate to $BaTiO_3$ is suitable for improving the relative dielectric constant of the $BaTiO_3$ and its temperature characteristic.

To achieve high insulating properties, the mean particle sizes of the BMTL and the BMTH are more preferably not more than 0.7 μm, particularly not more than 0.6 μm. To increase relative dielectric constant, they are preferably not less than 0.2 μm.

Additionally, it is preferable in the dielectric layer 5 that, letting the grain boundary phase 15 as a grain boundary surface have the highest concentration, the rare earth element has a concentration gradient from the crystal particle surface to the particle interior, and that it is not less than 0.05 atomic %/nm. In short, if the concentration gradient of the rare earth element is in such conditions, the relative dielectric constant and high-temperature load lifetime can be improved, and capacity temperature characteristic satisfying X7R standard can be obtained.

As a rare earth element in the invention, it is preferable to use at least one selected from La, Ce, Pr, Nd, Sm, Gd, Th, Dy, Ho, Y, Er, Tm, Yb, Lu, and Sc. In particular, Y is preferable.

As described above, the $BaTiO_3$ crystal particle of the invention is one in which Mg goes into solid solution at a surface region by calcination. To enhance suppression of the diffusion and solid solution of the rare earth element, the concentration gradient of Mg at the surface region of the $BaTiO_3$ crystal particles is preferably not less than 0.003 atomic %/nm, more preferably not less than 0.01 atomic %/nm, toward the particle inside, letting the particle boundary side be high concentration side.

Manufacturing Method

A manufacturing method of the invention comprises the step of preparing $BaTiO_3$ powder having a mean particle size of 0.05 to 0.5 μm, and $Ba_{1-x}M_xTiO_3$ (M is Mg, Ca, or Sr; and X is 0.01 to 0.2) powder having a smaller mean particle size than the $BaTiO_3$ powder; and the step of preparing calcined powder of $BaTiO_3$ and calcined powder of $Ba_{1-x}M_xTiO_3$ (M is Mg, Ca, or Sr; and X is 0.01 to 0.2) powder by adding an oxide of an alkaline earth metal element except for Ba into the $BaTiO_3$ powder and the $Ba_{1-x}M_xTiO_3$ powder, respectively, and then calcining these powders at temperatures of under 850° C., respectively.

Here, it is important to prepare the powder in which the oxide of an alkaline earth metal element goes into solid solution and is formed on the surfaces of both powders, by subjecting the $BaTiO_3$ powder and the $Ba_{1-x}M_xTiO_3$ powder to calcination at temperatures of under 850° C. Preferably, the oxide of an alkaline earth metal element is present on the surfaces of both powders.

The $BaTiO_3$ powder and $Ba_{1-x}M_xTiO_3$ powder used here as the main raw materials are preferably obtained by hydrothermal synthesis method, because particle size distribution is narrow and crystal properties is high. The mean particle size is preferably not less than 0.2 μm and not more than 0.4 μm. The specific surface area of such fine powders is preferably 1.7 to 6.6 ($m^2$/g). On the other hand, it is important that the mean particle size of the $Ba_{1-x}M_xTiO_3$ powder is smaller than that of the $BaTiO_3$ powder. That is, it is preferably 0.04 to 0.4 μm, particularly 0.15 to 0.35 μm.

Specifically, in the present invention it is also desirable to set surface specific area to the above range, in addition to mean particle size, because it is necessary to allow the powders to involve an appropriate grain growth and have high reactivity, in order to form, by a low-temperature calcination, the $BaTiO_3$ powder in which, for example, MgO goes into solid solution on the surface, and increase alternating field characteristic after firing.

Calcination temperature is preferably under 850° C., particularly under 750° C., in order to prevent MgO from going into solid solution in the $BaTiO_3$ powder and the $Ba_{1-x}M_xTiO_3$ (M is Mg, Ca, or Sr; and X is 0.01 to 0.2) powder, in each of which MgO goes into solid solution on the surface, as described above. On the other hand, to ensure diffusion and solid solution of MgO into the surface of the $BaTiO_3$ powder, calination temperature is preferably above 600° C., particularly above 650° C. The mean particle size of MgO powder used here is preferably not more than 0.3 μm in order to increase the coating rate to the surface of the $BaTiO_3$ powder. In the present invention, the use of the BaTiO$_3$ powder after being subjected to calcination with the oxide of an alkaline earth metal element enables to suppress diffusion and solid solution of the rare earth element, and also suppress grain growth.

In contrast, when the calcination temperature, at which the oxide of an alkaline earth metal element such as MgO is allowed to go into solid solution in the BaTiO$_3$ powder and Ba$_{1-x}$M$_x$TiO$_3$ powder, is higher than 850° C., the oxide of the alkaline earth metal element in the vicinity of the grain boundary is apt to go into diffusion and solid solution. This facilitates the diffusion and solid solution of the rare earth element. As a result, the dielectric particles, which comprise mainly the barium titanate particles having a low concentration of the alkaline earth metal except for Ba, are apt to cause grain growth. The temperature characteristic of electrostatic capacity fails to satisfy a desired characteristic.

Unlike the above process of the invention, if BaTiO$_3$ powder and Ba$_{1-x}$M$_x$TiO$_3$ powder are added at a time, together with additives such as a rare earth element, without allowing, for example, MgO to previously go into solid solution in the BaTiO$_3$ powder and the Ba$_{1-x}$M$_x$TiO$_3$ powder, it is difficult to form one in which MgO goes into solid solution in a surface layer of the BaTiO$_3$. Hence, much M component and the like diffuse from the Ba$_{1-x}$M$_x$TiO$_3$. As a result, the relative dielectric constant inherent in the BaTiO$_3$ cannot be maintained, which can cause the electrostatic capacity drop. Further, grain growth is apt to occur. In the Ba$_{1-x}$M$_x$TiO$_3$, M is preferably Ca, and X is in the range of 0.02 to 0.1, in order to increase relative dielectric constant and flatten capacity temperature characteristic.

The proportion of the oxide of an alkaline earth metal element except for Ba to be added in the above step (a') in the manufacturing method of the invention is preferably, in mole ratio (mass ratio), 30 to 60% of the oxides of all alkaline earth metal elements to be added in the above steps (a') and (b'). The alkaline earth metal element is preferably MgO. The M component in the Ba$_{-x}$M$_x$TiO$_3$ is preferably Ca. The dielectric layer of the invention contains a glass phase. As this glass phase, glass powder of Si—Li—Ca type is suitable.

Next, a dielectric green sheet is formed by mixing the calcined power of the BaTiO$_3$ and the calcined powder of the Ba$_{1-x}$M$_x$TiO$_3$ with a rare earth element compound, an Mn compound, the rest oxide of the alkaline earth metal element, and an organic vehicle at a predetermined proportion to prepare a slurry, and then forming the slurry. The forming with use of the slurry is suitably performed by sheet forming method such as die coater. The thickness of the dielectric green sheet formed by this forming method is preferably not more than 5 μm, particularly not more than 4 μm.

Subsequently, an internal electrode pattern is formed on a surface of the dielectric green sheet. The internal electrode pattern is formed by performing screen-printing of one in which powder of a base metal, such as Ni or Cu, is pasted together with organic resin and solvent. The thickness of the internal electrode pattern is preferably not more than 4 μm that is thinner than the thickness of the dielectric green sheet, in order to minimize gaps on the dielectric green sheet.

Subsequently, a plurality of the dielectric green sheets with the internal electrode pattern formed thereon are laminated to form a forming body for capacitor body. The capacitor body is then subjected to debinding processing at 400 to 500° C. in atmosphere and at a temperature raising rate of 40 to 80° C./h. Thereafter, the temperature raising rate from 500° C. is set to 100 to 400° C./h, and this capacitor body is fired in reducing atmosphere at temperatures of 1100 to 1300° C. for 2 to 5 hours. This is followed by cooling at a temperature lowering rate of 80 to 400° C./h, and then reoxidization at 750 to 1100° C. in atmosphere.

Finally, a paste for external electrode is applied to both end surfaces of the fired capacitor body, and then baked in nitrogen to form an external electrode 3, thereby obtaining a multilayer ceramic capacitor of the invention.

Otherwise, this method is identical to that described in the first preferred embodiment.

EXAMPLES

Although the present invention will be described in more detail with reference to examples and comparative examples, it should be noted that the invention is not limited to the following examples.

Example 1

A multilayer ceramic capacitor was manufactured in the following manner. First, BaTiO$_3$ (BT) and (Ba$_{0.95}$Ca$_{0.05}$)TiO$_3$ (BCT) were previously prepared. A 0.25 mole parts of MgO was added to and mixed with BaTiO$_3$ powder, and then heated for 2 hours at a temperature presented in Table 1. Then, to 100 mole of the calcined BaTiO$_3$ powder and (Ba$_{0.95}$Ca$_{0.05}$)TiO$_3$ powder, 0.5 mole of Y$_2$O$_3$, 0.3 mole of MnCO$_3$, and 0.25 mole of MgO were added. Further, 0.5 mass parts of additive component composed of Li$_2$O, SiO$_2$ and CaO was added to 100 mass parts of BaTiO$_3$ and (Ba$_{0.95}$Ca$_{0.05}$)TiO$_3$. This mixed powder was subjected to wet grinding by ball mill using ZrO$_2$ balls having a diameter of 5 mm. An organic binder was then added thereto to prepare a slurry.

Subsequently, the obtained slurry was used to prepare a dielectric green sheet having a thickness of 2.5 μm by doctor blade process. On this dielectric green sheet, a conductor paste containing Ni metal was screen-printed to form an internal electrode pattern. Then, 388 dielectric green sheets with the internal electrode pattern formed thereon were laminated, and 20 dielectric green sheets without internal electrode pattern were laminated on the top and bottom surfaces, respectively. By using a press machine, these sheets were then integrated to obtain a multilayer body.

This multilayer body was cut in the shape of a lattice to obtain a capacitor body forming body of 2.3 mm×1.5 mm×1.5 mm.

This capacitor body forming body was then debinded at 500° C. in atmosphere and at a temperature raising rate of 50° C./h, and fired for 2 hours at 1200° C. (10$^{-11}$ atm in oxygen partial pressure) with the temperature raising rate from 500° C. set to 200° C./h. Subsequently, this was cooled to 800° C. at a temperature lowering rate of 200° C./h, and reoxidized at 800° C. in atmosphere for 4 hours, and then cooled at a temperature lowering rate of 200° C./h, resulting in a capacitor body. The thickness of the dielectric layer was 2.3 μm.

After the fired capacitor body was subjected to barrel polishing, an external electrode paste containing Cu powder and glass was applied to its both end portions, and baked in nitrogen at 850° C. to form external electrodes. Then, by using an electrolytic barrel machine, Ni and Sn were plated in this order on the surface of the external electrodes, thereby manufacturing a multilayer ceramic capacitor.

On the other hand, a sample (Sample No. 7) was manufactured in such a method including the step of calcining at a time the raw materials of $BaTiO_3$ and $(Ba_{0.95}Ca_{0.05})TiO_3$. Further, other sample (Sample No. 8) was prepared by setting the grain size of $BaTiO_3$ to 0.4 μm and that of $(Ba_{0.95}Ca_{0.05})TiO_3$ to 0.35 μm, setting the calcination temperature of MgO to the $BaTiO_3$ to 850° C., and letting other additive composition and procedure be the same as in the steps of the invention.

Additionally, other samples (Sample Nos. 9 and 10) were prepared by using only $BaTiO_3$ powder or only $(Ba_{0.95}Ca_{0.05})TiO_3$ powder, and letting other additive composition and procedure be the same as in the steps of the invention.

The electrostatic capacity and dielectric loss of the manufactured multilayer ceramic capacitors were measured at a frequency of 1.0 KHz and an input signal level of 0.5 V, by using an LCR meter 4284A. The relative dielectric constant was calculated from the electrostatic capacity, the effective area of the internal electrode layer, and the thickness of the dielectric layer. Then, the temperature characteristic of electrostatic capacity was determined in the range of −55 to 125° C., with the electrostatic capacity at 25° C. as reference. A high-temperature load test was carried out for 1000 hours at a temperature of 125° C. and a voltage of 9.45 V. Variations in the insulation resistances of 30 samples were measured. In this case, the samples having no defect were regarded as being excellent. Crystal particle size and its variations were determined with photographs taken on an electron microscope by using intercept method.

Relating to the presence of the rare earth element in crystal particles constituting the dielectric layer, the samples, whose section was polished, were evaluated on a transmission electron microscope and an energy dispersive spectrograph (EDS).

Relating to Ca concentration, an arbitrary location in the vicinity of the center was also analyzed on the transmission electron microscope and the EDS. One whose Ca concentration was higher than 0.3 atomic % (round a number to one decimal) was regarded as dielectric particles having a high Ca concentration. This analysis was performed for 100 to 150 major crystal particles.

In the mean crystal particle size of the crystal particles in Sample Nos. 1 to 6 of the invention, the dielectric particles that have a high Ca concentration and comprises mainly Ba and Ti (BMTH) was 0.4 μm, and the dielectric particles that have a low Ca concentration and comprises mainly Ba and Ti (BMTL) was 0.3 to 0.35 μm. Both of the BMTH and the BMTL were not more than 0.5 in variations of mean crystal particle size (CV value).

TABLE 1

| | | | BT | | BCT | | |
|---|---|---|---|---|---|---|---|
| Sample No. | Calcining method** | Calcination temp. ° C. | Mean particle size (μm) | Amount (mole %) | Mean particle size (μm) | Ca amount x | Amount (mole %) |
| 1 | Calcining BT only + MgO | 850 | 0.3 | 50 | 0.35 | 0.05 | 50 |
| 2 | Calcining BT only + MgO | 850 | 0.3 | 60 | 0.35 | 0.05 | 40 |
| 3 | Calcining BT only + MgO | 850 | 0.3 | 40 | 0.35 | 0.05 | 60 |
| 4 | Calcining BT only + MgO | 850 | 0.35 | 50 | 0.35 | 0.05 | 50 |
| 5 | Calcining BT only + MgO | 850 | 0.35 | 60 | 0.35 | 0.05 | 40 |
| 6 | Calcining BT only + MgO | 850 | 0.35 | 40 | 0.35 | 0.05 | 60 |
| 7 | BT + BCT (at a time) | 1150 | 0.35 | 50 | 0.35 | 0.05 | 50 |
| 8 | Calcining BT only + MgO | 850 | 0.4 | 50 | 0.35 | 0.05 | 50 |
| 9 | Calcining BT only + MgO | 850 | 0.35 | 100 | — | — | — |
| 10 | Calcining BCT only + MgO | — | — | — | 0.35 | 0.05 | 100 |

**"BT + BCT (at a time)" means that $BaTiO_3$, (Ba, M)$TiO_3$ and additives were mixed and calcined at a time. "Calcining BT only + MgO" means that MgO was added to $BaTiO_3$ only and calcined in advance.

TABLE 2

| | Crystal particle | | | | Relative dielectric constant | Capacity temperature characteristic ΔC/C(%) at 125° C. % | X7R | High-temperature load lifetime 125° C., 9.45 V |
|---|---|---|---|---|---|---|---|---|
| Sample No. | Area ratio BMTL/BMTH | BMTL (μm) | BMTH (μm) | Concentration gradient of rare earth element atomic %/nm | | | | |
| 1 | 0.4 | 0.3 | 0.4 | 0.13 | 3190 | −8.9 | ○ | ○ |
| 2 | 0.45 | 0.3 | 0.4 | 0.09 | 3300 | −11 | ○ | ○ |
| 3 | 0.41 | 0.3 | 0.4 | 0.12 | 3050 | −8.5 | ○ | ○ |
| 4 | 0.43 | 0.35 | 0.4 | 0.12 | 3550 | −14.5 | ○ | ○ |
| 5 | 0.52 | 0.35 | 0.4 | 0.13 | 3600 | −14.5 | ○ | ○ |
| 6 | 0.47 | 0.35 | 0.4 | 0.12 | 3450 | −14 | ○ | ○ |
| 7 | 0.35 | 0.38 | 0.42 | 0.03 | 2500 | −18.5 | x | x |
| 8 | 0.9 | 0.45 | 0.4 | 0.16 | 3700 | −17.5 | x | ○ |
| 9 | — | 0.35 | — | 0.16 | 2800 | −18.2 | x | ○ |
| 10 | — | — | 0.6 | 0.17 | 2000 | −12 | ○ | x |

As apparent from Tables 1 and 2, in Sample Nos. 1 to 6, which were prepared in the manufacturing method of the invention, these have a relative dielectric constant of not less than 3050, and their capacity temperature characteristics satisfy X7R standard. Additionally, these samples satisfy 1000 hours in the high-temperature load test at 125° C. and 9.45 V.

In Sample No. 7, the concentration gradient of the rare earth element is beyond the scope of the invention. Further, grain growth is caused by the development of solid solution, and the mean crystal particle size of dielectric particles having a high Ca concentration is larger than 0.4 µm. Therefore, when the dielectric layer thickness is 2.3 µm, as described above, the capacity temperature characteristic does not satisfy the X7R standard.

In Sample No. 8, the means crystal particle size of dielectric particles having a low Ca concentration is larger than that of dielectric particles having a low Ca concentration. Therefore, the relative dielectric constant is high, however, the capacity temperature characteristic does not satisfy the X7R standard.

Since in Sample No. 9, all of the dielectric particles have a low Ca concentration, the temperature characteristic of electrostatic capacity does not satisfy the X7R standard.

Since in Sample No. 10, all of dielectric particles have a high Ca concentration, grain growth can be facilitated so that the mean crystal particle size is larger than 0.4 µm, thereby satisfying capacity temperature characteristic. However, this sample has a low relative dielectric constant and fails to satisfy high-temperature load lifetime.

Example 2

A multilayer ceramic capacitor was manufactured in the following manner. First, to 100 mole of $BaTiO_3$ (BT) and $(Ba_{0.95}Ca_{0.05})TiO_3$ (BCT), each having in advance a mean particle size presented in Table 3, 0.25 mole of MgO was weighed and mixed sufficiently, and then heated for 2 hours at a temperature presented in Table 3. Then, to 100 mole of this mixed powder of calcined $BaTiO_3$ and $(Ba_{0.95}Ca_{0.05})TiO_3$, a rare earth element in an amount presented in Table 3, 0.3 mole of $MnCO_3$, and 0.25 mole of MgO were added.

Then, 0.5 mass parts of an additive component composed of $Li_2O$, $SiO_2$ and CaO was added to 100 mass parts of the $BaTiO_3$ and $(Ba_{0.95}Ca_{0.05})TiO_3$. This mixed powder was subjected to wet grinding by ball mill using $ZrO_2$ balls having a diameter of 5 mm φ. An organic binder was then added thereto to prepare a slurry. Subsequently, the obtained slurry was used to prepare a dielectric green sheet having a thickness of 4 µm by doctor blade process.

On this dielectric green sheet, a conductor paste containing Ni metal was screen-printed to form an internal electrode pattern. Then, 388 dielectric green sheets with the internal electrode pattern formed thereon were laminated, and 20 dielectric green sheets without internal electrode pattern were laminated on the top and bottom surfaces, respectively. By using a press machine, these sheets were then integrated to obtain a multilayer body.

This multilayer body was cut in the shape of a lattice to obtain a capacitor body forming body of 2.3 mm×1.5 mm×1.5 mm.

This capacitor body forming body was then debinded at 500° C. in atmosphere and at a temperature raising rate of 50° C./h, and fired for 2 hours at 1240° C. ($10^{-11}$ atm in oxygen partial pressure) with the temperature raising rate from 500° C. set to 200° C./h. Subsequently, this was cooled to 800° C. at a temperature lowering rate of 200° C./h, and reoxidized at 800° C. in atmosphere for 4 hours, and then cooled at a temperature lowering rate of 200° C./h, resulting in a capacitor body. The thickness of the dielectric layer was 2.3 µm.

After the fired capacitor body was subjected to barrel polishing, an external electrode paste containing Cu powder and glass was applied to its both end portions, and baked in nitrogen at 850° C. to form external electrodes. Then, by using an electrolytic barrel machine, Ni and Sn were plated in this order on the surface of the external electrodes, thereby manufacturing a multilayer ceramic capacitor.

The electrostatic capacity and dielectric loss of the manufactured multilayer ceramic capacitor were measured at a frequency of 1.0 KHz and an input signal level of 0.5 V by using an LCR meter 4284A. Its relative dielectric constant was calculated from the electrostatic capacity, the effective area of the internal electrode layer, and the thickness of the dielectric layer.

Then, the temperature characteristic of electrostatic capacity was determined in the range of −55 to 125° C., with the electrostatic capacity at 25° C. as reference. A high-temperature load test was carried out for 1000 hours at a temperature of 125° C. and a voltage of 9.45 V. Variations in the insulation resistances of 30 samples were measured. In this case, the samples having no defect were regarded as being excellent. Crystal particle size and its variations were determined with photographs taken on an electron microscope by using intercept method.

Relating to the presence of rare earth element in crystal particles constituting the dielectric layer, the samples, whose section was polished, were evaluated on a transmission electron microscope and an EDS.

Relating to Ca concentration, an arbitrary location in the vicinity of the center was also analyzed on the transmission electron microscope and the EDS. One whose Ca concentration was higher than 0.3 atomic % (round a number to one decimal) was regarded as dielectric particles having a high Ca concentration. This analysis was performed for 100 to 150 major crystal particles.

In the crystal particles in the samples of the invention, the dielectric particles having a low Ca concentration and comprising mainly Ba and Ti (BMTL) had a mean crystal particle size of 0.4 µm, and the dielectric particles having a high Ca concentration and comprising mainly Ba and Ti (BMTH) had a mean crystal particle size of 0.3 µm. Both of the BMTL and the BMTH were not more than 0.5 in variations of mean crystal particle size (CV value).

As a comparative example, one (Sample No. 11) was manufactured by setting the raw material particle size of $BaTiO_3$ to 0.4 µm, and that of $(Ba_{0.95}Ca_{0.05})TiO_3$ to 0.35 µm, and setting the calcination temperature of MgO to the $BaTiO_3$ to 1150° C., and letting other additive composition and procedure be the same as in the steps of the invention. Additionally, other ones (Sample Nos. 12 and 13) were manufactured by using only $BaTiO_3$ powder or only $(Ba_{0.95}Ca_{0.05})TiO_3$ powder, and letting other additive composition and procedure be the same as in the steps of the invention.

TABLE 3

| Sample No. | Calcining method | Calcination temp. °C. | Calcining method | Calcination temp. °C. | BT *3 Mean particle size(μm) | BT *3 Amount (mole %) | BCT *4 Mean particle size(μm) | BCT *4 Ca amount X | BCT *4 Amount (mole %) | Added rare earth element Component | Added rare earth element mole % |
|---|---|---|---|---|---|---|---|---|---|---|---|
| 11 | BT + BCT (at a time) | 1150 | BT + BCT (at a time) | 1150 | 0.4 | 50 | 0.35 | 0.05 | 50 | Y | 0.5 |
| 12 | BT + MgO | 850 | — | — | 0.4 | 100 | — | — | — | Y | 0.5 |
| 13 | — | — | BCT + MgO | — | — | — | 0.35 | 0.05 | 100 | Y | 0.5 |
| 14 | BT + MgO | 850 | BCT + MgO | 850 | 0.4 | 70 | 0.35 | 0.05 | 30 | Y | 0.5 |
| 15 | BT + MgO | 850 | BCT + MgO | 850 | 0.4 | 50 | 0.35 | 0.05 | 50 | Y | 0.5 |
| 16 | BT + MgO | 850 | BCT + MgO | 850 | 0.4 | 50 | 0.35 | 0.05 | 50 | Y | 0.25 |
| 17 | BT + MgO | 850 | BCT + MgO | 850 | 0.4 | 50 | 0.35 | 0.05 | 50 | Y | 1 |
| 18 | BT + MgO | 700 | BCT + MgO | 700 | 0.35 | 50 | 0.35 | 0.05 | 50 | Y | 0.5 |
| 19 | BT + MgO | 700 | BCT + MgO | 700 | 0.35 | 50 | 0.3 | 0.05 | 50 | Y | 0.5 |
| 20 | BT + MgO | 700 | BCT + MgO | 700 | 0.35 | 50 | 0.3 | 0.05 | 50 | Y | 0.25 |
| 21 | BT + MgO | 700 | BCT + MgO | 700 | 0.3 | 50 | 0.25 | 0.05 | 50 | Y | 1 |

**"BT + BCT(at a time)" means that BT and BCT powders were calcined at a time. "BT + MgO" and "BCT + MgO" mean that calcination was performed separately.
*3: $BaTiO_3$
*4: $Ba_{1-x}Ca_xTiO_3$

TABLE 4

| | Dielectric particle | | | | Capacity | | | | |
|---|---|---|---|---|---|---|---|---|---|
| Sample No. | Mean particle size ratio DL/DH** | Mean particle size frequency of BT(BMTL) ≦0.7 μm Frequency (%) | Mean particle size frequency of BCT(BMTH) ≦0.5 μm Frequency (%) | Concentration gradient of rare earth element atomic %/nm | Relative dielectric constant 0.02 V/μm | Relative dielectric constant 0.1 V/μm | Relative dielectric constant 1 V/μm | temperature characteristic ΔC/C (%) at 125° C. % | X7R | Insulation resistance GΩ |
| 11 | 0.9 | 85 | 93 | 0.03 | 2600 | 3100 | 4500 | −16.5 | x | >10 |
| 12 | — | 100 | — | 0.09 | 2800 | 2900 | 3500 | −18.5 | x | >10 |
| 13 | — | — | 97 | 0.12 | 2100 | 3400 | 6000 | 12.2 | ○ | 0.2 |
| 14 | 1.14 | 100 | 100 | 0.13 | 4010 | 4800 | 5500 | −14.5 | ○ | >10 |
| 15 | 1.14 | 100 | 100 | 0.12 | 3800 | 4000 | 4900 | −10.2 | ○ | >10 |
| 16 | 1.14 | 100 | 100 | 0.12 | 3900 | 4200 | 5200 | −8.3 | ○ | >10 |
| 17 | 1.14 | 100 | 100 | 0.12 | 3400 | 3600 | 3900 | −13.5 | ○ | >10 |
| 18 | 1 | 100 | 100 | 0.16 | 3780 | 4010 | 5000 | −9.3 | ○ | >10 |
| 19 | 1.17 | 100 | 100 | 0.16 | 3100 | 3350 | 3700 | −10.4 | ○ | >10 |
| 20 | 1.17 | 100 | 100 | 0.17 | 3350 | 3820 | 4000 | −8.4 | ○ | >10 |
| 21 | 1.17 | 100 | 100 | 0.17 | 3400 | 3500 | 3750 | −12.6 | ○ | >10 |

**DL(Mean particle size of $BaTiO_3$), DH(Mean particle size of $BaCaTiO_3$)

As apparent from Tables 3 and 4, in Sample Nos. 14 to 21, which were manufactured in the method of the invention, the relative dielectric constant is not less than 3100 in an alternating field range of 0.02 to 1 Vrms/μm, and capacity temperature characteristic satisfies the X7R standard, and insulation resistance also satisfies 10 GΩ.

On the other hand, in Sample No. 11, subjected to batch calcination at 1150° C., DL/DH is 0.9, and the temperature characteristic of electrostatic capacity becomes large, thus failing to satisfy the X7R standard.

The sample using only the BMTL also fails to satisfy the X7R standard. In the sample using only the BMTH, insulation resistance is as low as 0.2 GΩ.

What is claimed is:

1. A multilayer ceramic capacitor comprising a dielectric layer and an internal electrode layer that are alternately laminated,
the dielectric layer having (i) barium titanate particles containing an alkaline earth metal component except for Ba in a proportion of not more than 0.2 atomic % (BMTL), and (ii) barium titanate particles containing an alkaline earth metal component except for Ba in a proportion of not less than 0.4 atomic % (BMTH), the BMTL and the BMTH coexisting in an area ratio of BMTL/BMTH=0.1 to 9.

2. The multilayer ceramic capacitor according to claim 1, wherein the dielectric layer satisfies the relationship of DL≦DH, where DL is a mean particle size of BMTL, and DH is a mean particle size of BMTH.

3. The multilayer ceramic capacitor according to claim 1, wherein the alkaline earth metal component is at least one selected from Mg, Ca, and Sr.

4. The multilayer ceramic capacitor according to claim 1, wherein the BMTL and the BMTH have a mean particle size of not more than 0.5 μm.

5. The multilayer ceramic capacitor according to claim 1, wherein the dielectric layer has a thickness of not more than 4 μm.

6. The multilayer ceramic capacitor according to claim 1, wherein the internal electrode layer comprises mainly a base metal.

7. The multilayer ceramic capacitor according to claim 1, wherein the dielectric layer satisfies the relationship of DL>DH, where DL is a mean particle size of BMTL, and DH is a mean particle size of BMTH.

8. The multilayer ceramic capacitor according to claim 7, wherein DL/DH is 1.1 to 2.

9. The multilayer ceramic capacitor according to claim 7, wherein an alkaline earth metal component is at least one selected from Mg, Ca, and Sr.

10. The multilayer ceramic capacitor according to claim 7, wherein the BMTL and the BMTH have a mean particle size of not more than 0.7 μm.

11. The multilayer ceramic capacitor according to claim 7, wherein both BMTL and BMTH contain a rare earth metal element, and its concentration gradient is not less than 0.05 atomic %/nm from a surface to an interior, letting a particle surface have the highest concentration.

12. The multilayer ceramic capacitor according to claim 7, wherein the dielectric layer has a thickness of not more than 4 μm.

13. The multilayer ceramic capacitor according to claim 7, wherein the internal electrode layer comprises mainly a base metal.

14. The multilayer ceramic capacitor according to claim 1, wherein the BMTH contains an alkaline earth metal component except for Ba, in a proportion of 0.5 to 2.5 atomic %.

* * * * *